US012544887B2

(12) United States Patent
Wu

(10) Patent No.: US 12,544,887 B2
(45) Date of Patent: Feb. 10, 2026

(54) TORQUE SENSING DEVICE OF POWER TOOL

(71) Applicant: MATATAKITOYO TOOL CO., LTD., Taichung (TW)

(72) Inventor: Yi-Min Wu, Taichung (TW)

(73) Assignee: MATATAKITOYO TOOL CO., LTD., Taichung (TW)

( * ) Notice: Subject to any disclaimer, the term of this patent is extended or adjusted under 35 U.S.C. 154(b) by 729 days.

(21) Appl. No.: 17/955,414

(22) Filed: Sep. 28, 2022

(65) Prior Publication Data

US 2024/0100664 A1 Mar. 28, 2024

(51) Int. Cl.
*B25B 23/147* (2006.01)

(52) U.S. Cl.
CPC .................................. *B25B 23/147* (2013.01)

(58) Field of Classification Search
CPC ... B25B 23/147; B25B 23/1475; B25B 23/16; B25B 23/15; B25B 29/00
USPC ....................................................... 73/862.08
See application file for complete search history.

(56) References Cited

U.S. PATENT DOCUMENTS

| | | | | |
|---|---|---|---|---|
| 2016/0185419 | A1 | 6/2016 | Bendel et al. | |
| 2019/0118352 | A1* | 4/2019 | Weber | B25F 5/02 |
| 2021/0122016 | A1 | 4/2021 | Hsu et al. | |
| 2022/0184792 | A1* | 6/2022 | Nakatsuka | H02K 7/116 |
| 2023/0001560 | A1* | 1/2023 | Wu | B25B 21/00 |

FOREIGN PATENT DOCUMENTS

| | | | |
|---|---|---|---|
| EP | 4116035 | A1 | 1/2023 |
| JP | 2001088046 | A | 4/2001 |
| JP | 2008183644 | A | 8/2008 |
| JP | 2009058388 | A | 3/2009 |
| JP | 2011230236 | A | 11/2011 |
| JP | 2016099163 | A | 5/2016 |
| JP | 2022030201 | A | 2/2022 |
| TW | 201028255 | A * | 8/2010 |
| TW | 201144134 | A | 12/2011 |
| TW | I775459 | B | 8/2022 |

OTHER PUBLICATIONS

Office Action dated Feb. 6, 2023 of the corresponding Taiwan patent application No. 111131531.
Office Action dated Apr. 6, 2023 of the corresponding European patent application No. 22200121.6.

* cited by examiner

*Primary Examiner* — Laura Martin
(74) *Attorney, Agent, or Firm* — HDLS IPR SERVICES; Chun-Ming Shih

(57) ABSTRACT

A torque sensing device of a power tool (1) includes an outer casing (10), a power structure (20), a jacket (30), an inner casing socket (40), a bearing set (50) and a torque sensor (10). The power structure (20) is installed in the outer casing (10) and includes a power body (21) with a drive shaft (211). The jacket (30) sheathes the power body (21). The bearing set (50) includes a front bearing (51) installed between the jacket (30) and the inner casing socket (40), and a rear bearing (51) installed between the inner casing socket (40) and the outer casing (10). The torque sensor (10) is installed on the inner casing socket (40) to provide an accurate torque value.

10 Claims, 6 Drawing Sheets

1

TORQUE SENSING DEVICE OF POWER TOOL

BACKGROUND OF THE DISCLOSURE

Technical Field

The technical field relates to a power tool, and more particularly relates to a torque sensing device of a power tool.

Description of Related Art

At present, the related-art power tools equipped with a torque sensor are generally used for detecting a torque value and transmitting a signal when the detected torque value has reached a predetermined torque value to control and stop the operation of a power body. In addition, a general torque sensor of the power tool is installed on a transmission mechanism, so that the torque sensor is in a rotating state for a long time with the operation of the transmission mechanism, which may cause problems such as wire breakage and poor contact and in turn affect the electrical connection and cause damage to the power tool. In addition, during the operation of the power tool, the transmission mechanism connected to a tool head may occur vibration or deformation, which may affect the torque value detected by the torque sensor and reduce the accuracy of the torque sensor.

In view of the aforementioned problems, the discloser proposed this disclosure based on his expert knowledge and elaborated researches to overcome the problems of the related art.

SUMMARY OF THE DISCLOSURE

Therefore, it is a primary object of this disclosure to provide a torque sensing device of a power tool, and a torque sensing device is installed on an inner casing socket without being affected by the vibration of the power body directly, thereby providing an accurate torque value.

Another object of this disclosure is to provide a torque sensing device of a power tool, and the torque sensor is not directly fixed onto a component that transmits power and does not rotate with the power device, so as to avoid the problems of wire breakage and poor contact and improve the convenience of installation and assembling.

In order to achieve the aforementioned and other objects, the present disclosure provides a torque sensing device of a power tool, which includes an outer casing, a power structure, a jacket, an inner casing socket, a bearing set and a torque sensor, and the power structure is installed in the outer casing and includes a power body with a drive shaft, and the jacket is adapted to sheathe the power body. The bearing set includes a front bearing and a rear bearing, and the front bearing is installed between the jacket and the inner casing socket, and the rear bearing is installed between the inner casing socket and the outer casing. At least one torque sensor is installed on the inner casing socket.

Compared with the related art, the torque sensing device of a power tool in accordance with this disclosure has the torque sensor installed at the inner casing socket, and the torque of the power body is transmitted to the torque sensor through the jacket and the inner casing socket. If the torque of the power body exceeds a predetermined torque, the power body is situated in a reverse rotation state and the reverse rotation force is transmitted to the jacket and the inner casing socket, and further transmitted to the torque sensor. Since the torque sensor is not fixed directly onto a component that transmits power, therefore the torque sensor may not be affected by the vibration of the power body. As a result, the torque sensor is capable of detecting the torque of the power body, providing an accurate torque value, and improving the practicality of use.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
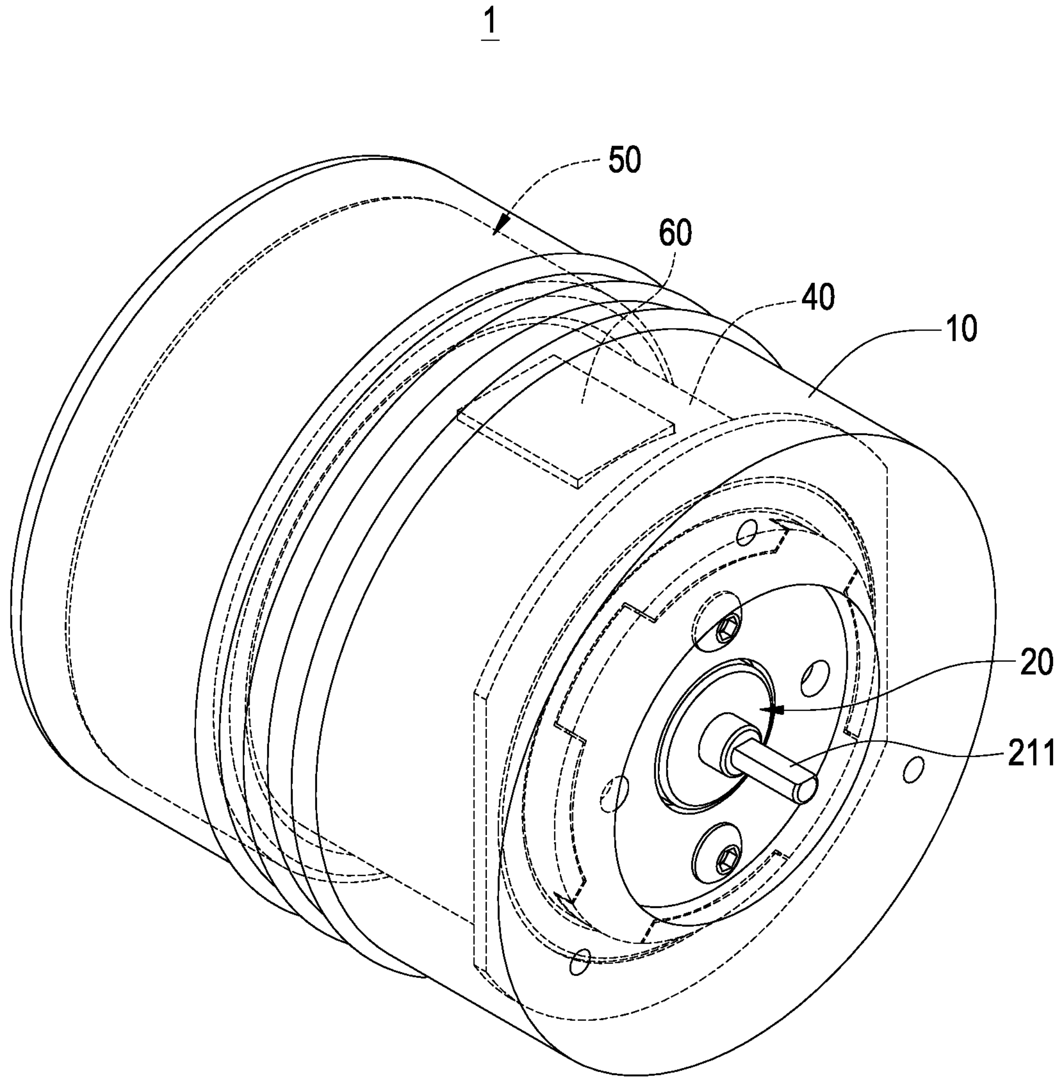
FIG. 1 is a perspective view of a torque sensing device of this disclosure.
Figure 2:
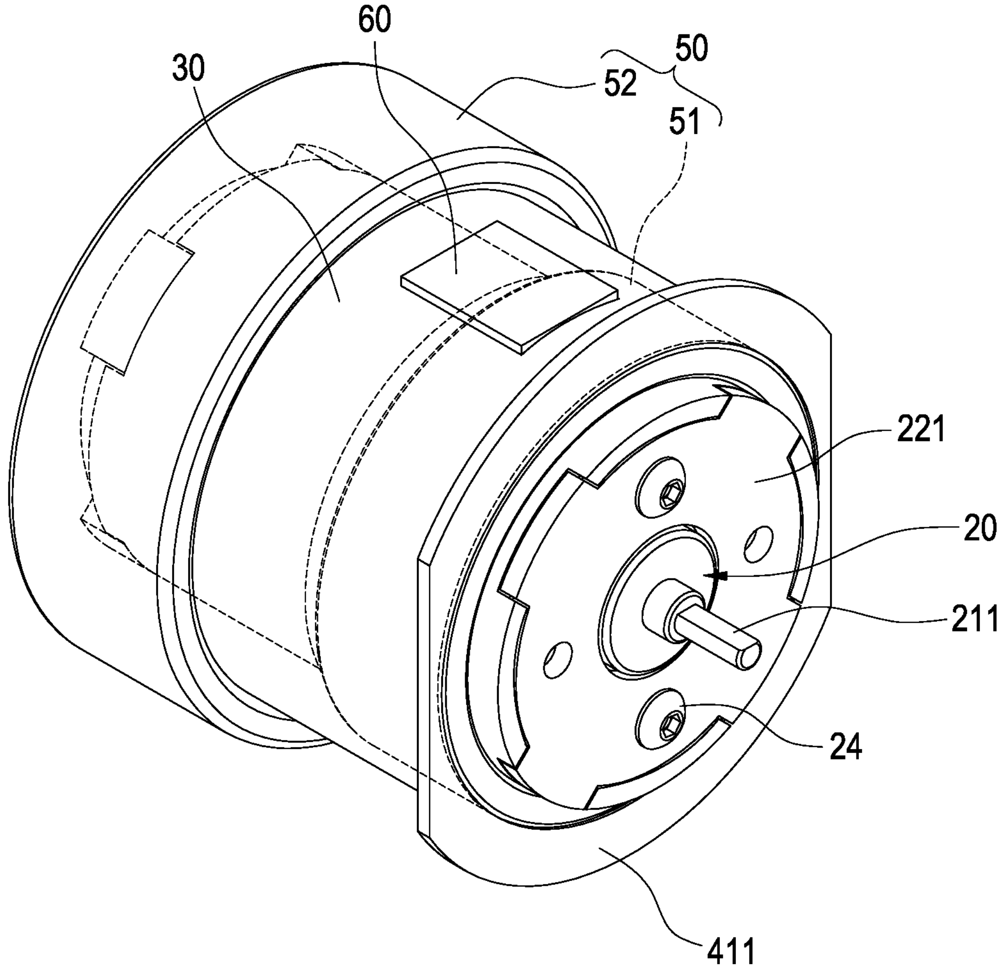
FIG. 2 is a perspective view of a torque sensing device without an outer casing in accordance with this disclosure.
Figure 3:
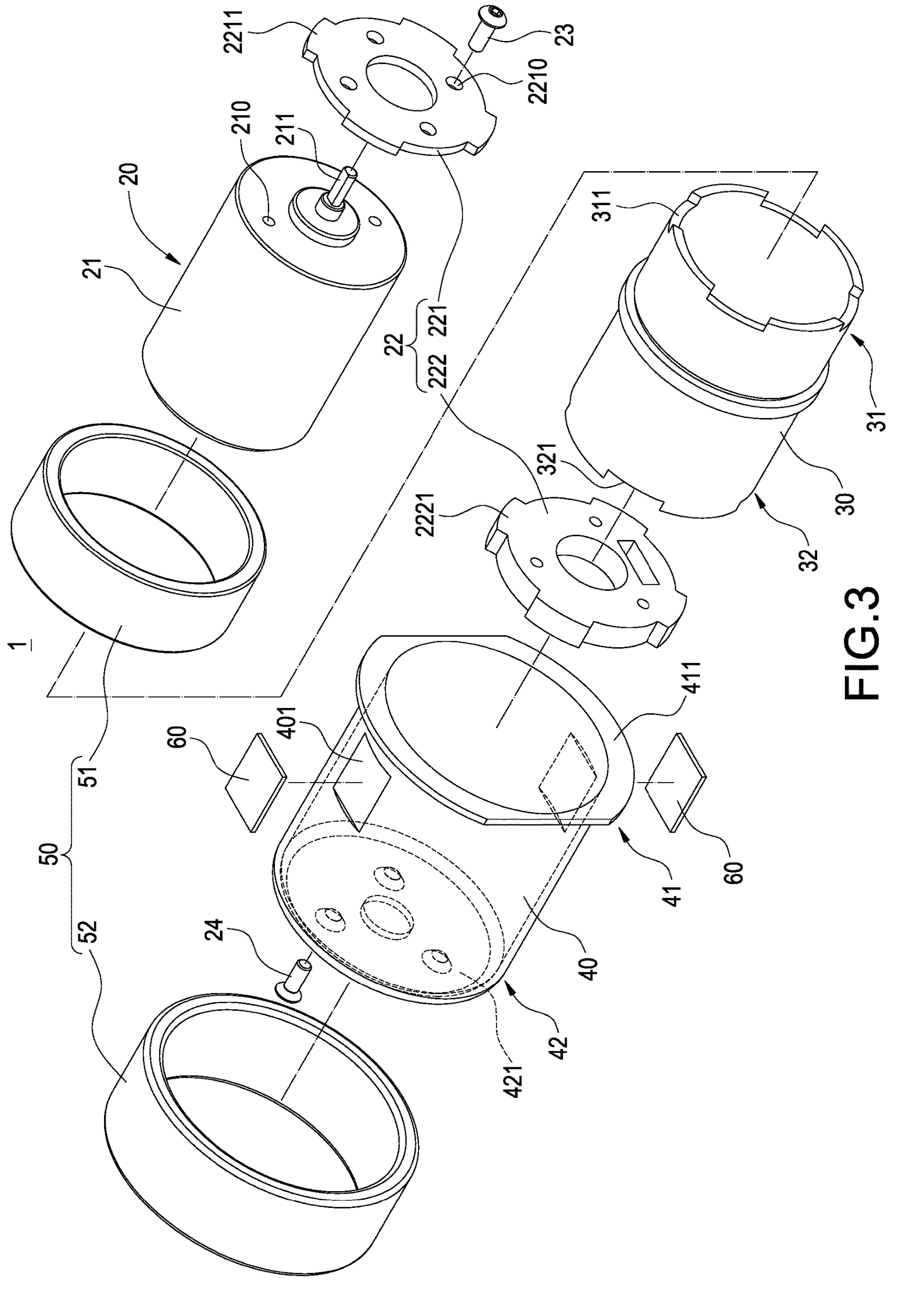
FIG. 3 is an exploded view of a torque sensing device without an outer casing in accordance with this disclosure.

With reference to FIGS. 1 to 3 for the perspective view of a torque sensing device and the perspective and exploded views of the torque sensing device without an outer casing in accordance with this disclosure respectively, the torque sensing device 1 of a power tool includes an outer casing 10, a power structure 20, a jacket 30, an inner casing socket 40, a bearing set 50 and at least one torque sensor 60. The power structure 20 is installed in the outer casing 10 and includes a power body 21. The jacket 30 sheathes the power body 21, and the inner casing socket 40 is engaged with the jacket 30. The bearing set 50 is installed between the power body 21 and the outer casing 10. The torque sensor 60 is installed onto the inner casing socket 40. Therefore, the power tool may measure a torque value through the torque sensor 60 to control the operation of the power body 21. The torque sensing device 1 is described in detail below.

The outer casing 10 is an outer casing of a power tool and the power structure 20 is installed in the outer casing 10. The power structure 20 includes a power body 21, and the power body 21 has a drive shaft 211. In this embodiment, the power body 21 is an electric motor that uses a battery as a power source to drive the drive shaft 211 to rotate. In actual implementation, the power body 21 may also be a pneumatic motor that uses compressed air as the power source to drive the drive shaft 211 to rotate.

The jacket 30 sheathes the power body 21 and has a jacket front side 31 near the drive shaft 211 and a jacket rear side 32 opposite to the jacket front side 31. An edge of the jacket front side 31 is provided with a plurality of front pawls 311. An edge of the jacket rear side 32 is provided with a plurality of rear pawls 321.

In addition, the inner casing socket 40 sheathes the jacket 30, and the inner casing socket 40 has an inner casing front side 41 near the drive shaft 211 and an inner casing rear side 42 away from the drive shaft 211. The inner casing socket 40 has a front flange 411 formed at an edge of the inner casing front side 41 and a rear baffle 421 formed at the inner casing rear side 42.

The bearing set 50 includes a front bearing 51 and a rear bearing 52. The front bearing 51 is installed between the jacket 30 and the inner casing socket 40. The rear bearing 52 is installed between the inner casing socket 40 and the outer casing 10. In particular, the front bearing 51 is disposed on the jacket front side 31; and the rear bearing 52 is disposed on the inner casing rear side of the 42.

In an embodiment of this disclosure, the power structure 20 further includes a pair of motor fixing plates 22. The pair of motor fixing plates 22 include a front fixing plate 221 and a rear fixing plate 222 installed to two opposite sides of the jacket 30 respectively. The periphery of the front fixing plate 221 is provided with a plurality of front lugs 2211 spaced from one another. The periphery of the rear fixing plate 222 is provided with a plurality of rear lugs 2221 spaced from one another.

In particular, the front fixing plate 221 is positioned at an end of the jacket front side 31 through the front lugs 2211 being engaged with the front pawl 311 of the jacket 30. In addition, the rear fixing plate 222 is positioned at an end of the jacket rear side 32 through the rear lugs 2221 being engaged with the rear pawl 321 of the jacket 30.

In an embodiment of this disclosure, the power structure 20 further includes a plurality of front locking members 23 and a plurality of rear locking members 24. The front fixing plate 221 is provided with a plurality of first locking holes 2210, and the power body 21 is provided with a plurality of corresponding second locking holes 210. The front fixing plate 221 is fixed onto the power body 21 through the front locking members 23 passing through the first locking holes 2210 and the second locking holes 210. In addition, the rear fixing plate 222 is provided with a plurality of third locking holes 2220, and the rear baffle 421 of the inner casing socket 40 is provided with a plurality of fourth locking holes 4210. The rear fixing plate 222 is fixed onto the inner casing socket 40 through the rear locking members 24 passing through the fourth locking holes 4210 and the third locking holes 2220.

Further, the torque sensor 60 is a strain gauge mounted onto a rim surface of the inner casing socket 40. In this embodiment, there are a pair of torque sensors 60. The pair of torque sensors 60 are installed on two opposite sides of the inner casing socket 40 respectively, and the rim surface of the inner casing socket 40 is provided with a notch 401, and the torque sensor 60 is installed in the notch 401. It is noteworthy that the configuration of the notch 401 may provide a better position for the torque sensor 60.

Figure 4:
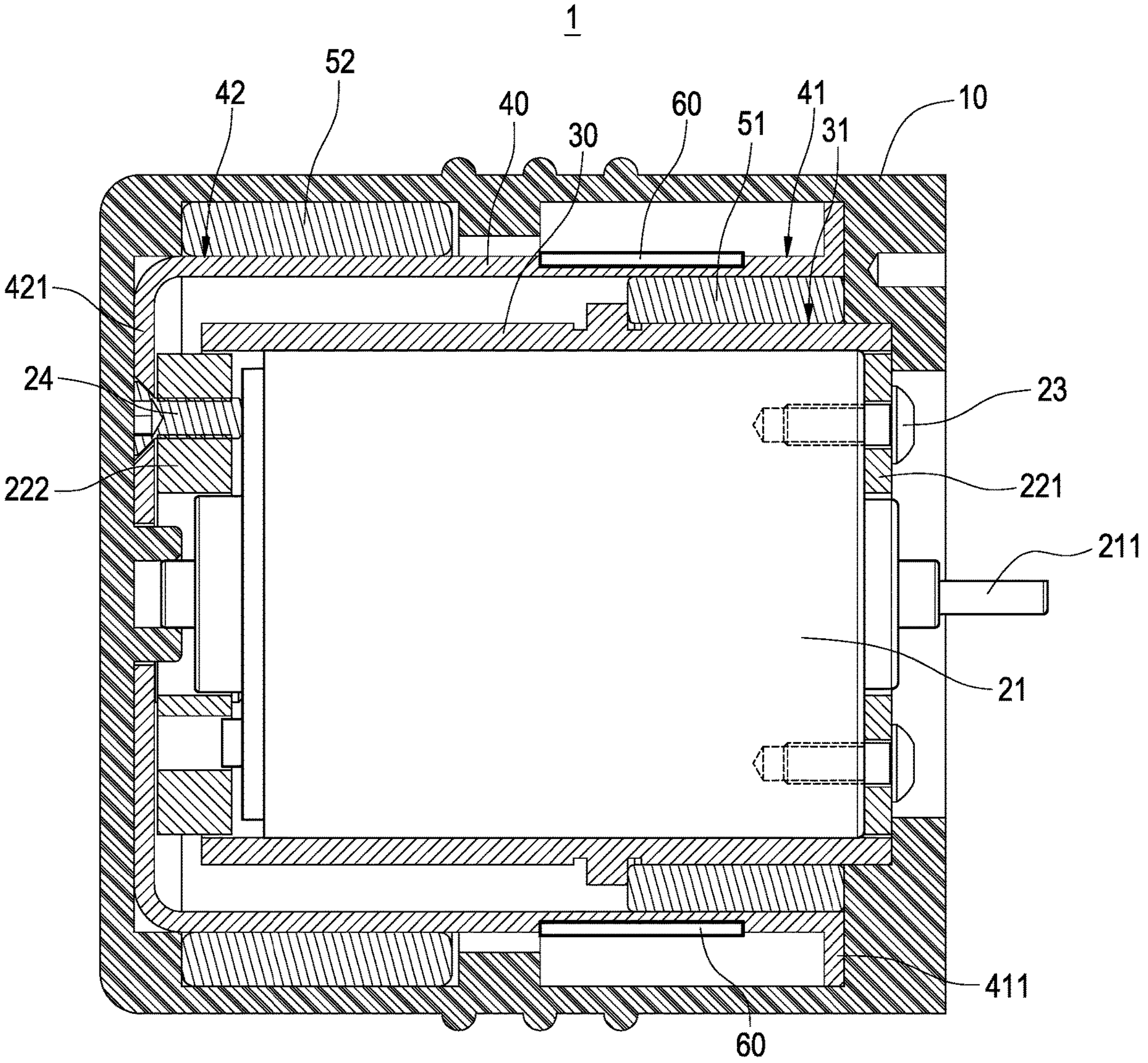
FIGS. 4 and 5 are cross-sectional views showing a torque sensing device of this disclosure viewing from two side directions respectively.
Figure 5:
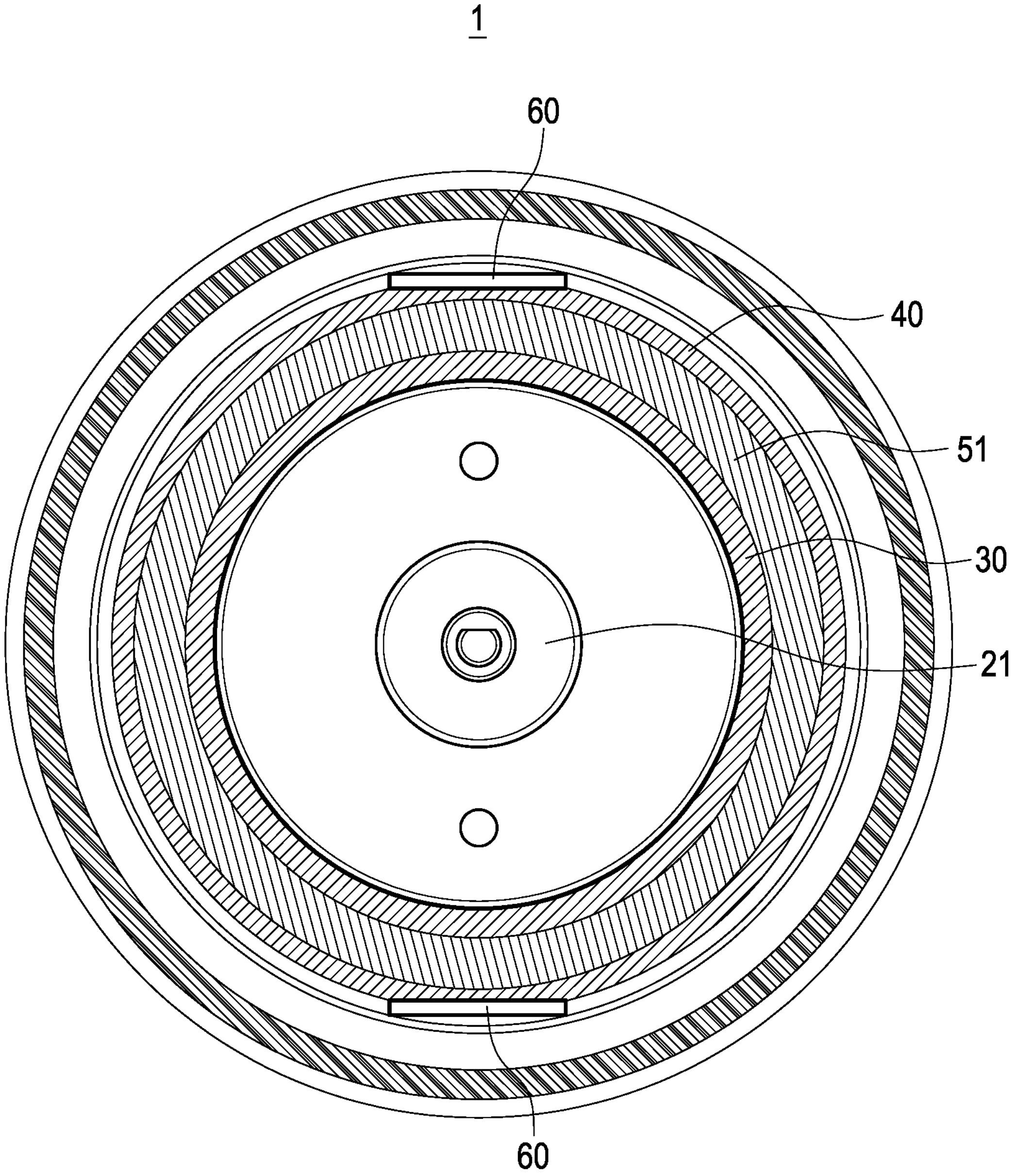

With reference to FIGS. 4 and 5 for the cross-sectional views showing the torque sensing device of this disclosure viewing from two side directions respectively, the power structure 20 as shown in FIG. 4 is installed in the outer casing 10. The front bearing 51 is installed between the jacket 30 and the inner casing socket 40 and disposed at the jacket front side 31. The rear bearing 52 is installed between the inner casing socket 40 and the outer casing 10 and disposed at the inner casing rear side 42. In addition, the pair of motor fixing plates 22 are installed on two opposite sides of the power body 21 respectively, and the front flange 411 of the inner casing socket 40 is fixed to an inner wall of the outer casing 10, and the rear baffle 421 of the inner casing socket 40 is attached to an inner wall of the outer casing 10. Since the inner casing front side 41 is fixed onto the outer casing 10, therefore when the inner casing rear side 42 is rotated, it will not drive the inner casing front side 41 to rotate altogether. As a result, the inner casing socket 40 is deformed, and the torque sensor 60 installed on the inner casing socket 40 receives a deformation signal, and when the power body 21 generates a reverse rotation force, the rear fixing plate 222 transmits the reverse rotation force to the rear baffle 421 for a rotation, so as to drive the inner casing socket 40 to have a rotational deformation.

In this embodiment as shown in FIG. 5, the pair of torque sensors 60 are installed on two opposite sides of the inner casing socket 40 respectively, and the torque generated by the power body 21 is transmitted through the jacket 30 and the inner casing socket 40 to each torque sensor 60. In particular, when the power body 21 is operated with resistance, it will generate a reverse rotation force, and the reverse rotation force may be transmitted to the jacket 30 and the inner casing socket 40, and further transmitted to the torque sensor 60, so that the torque sensor 60 generates a signal.

Figure 6:
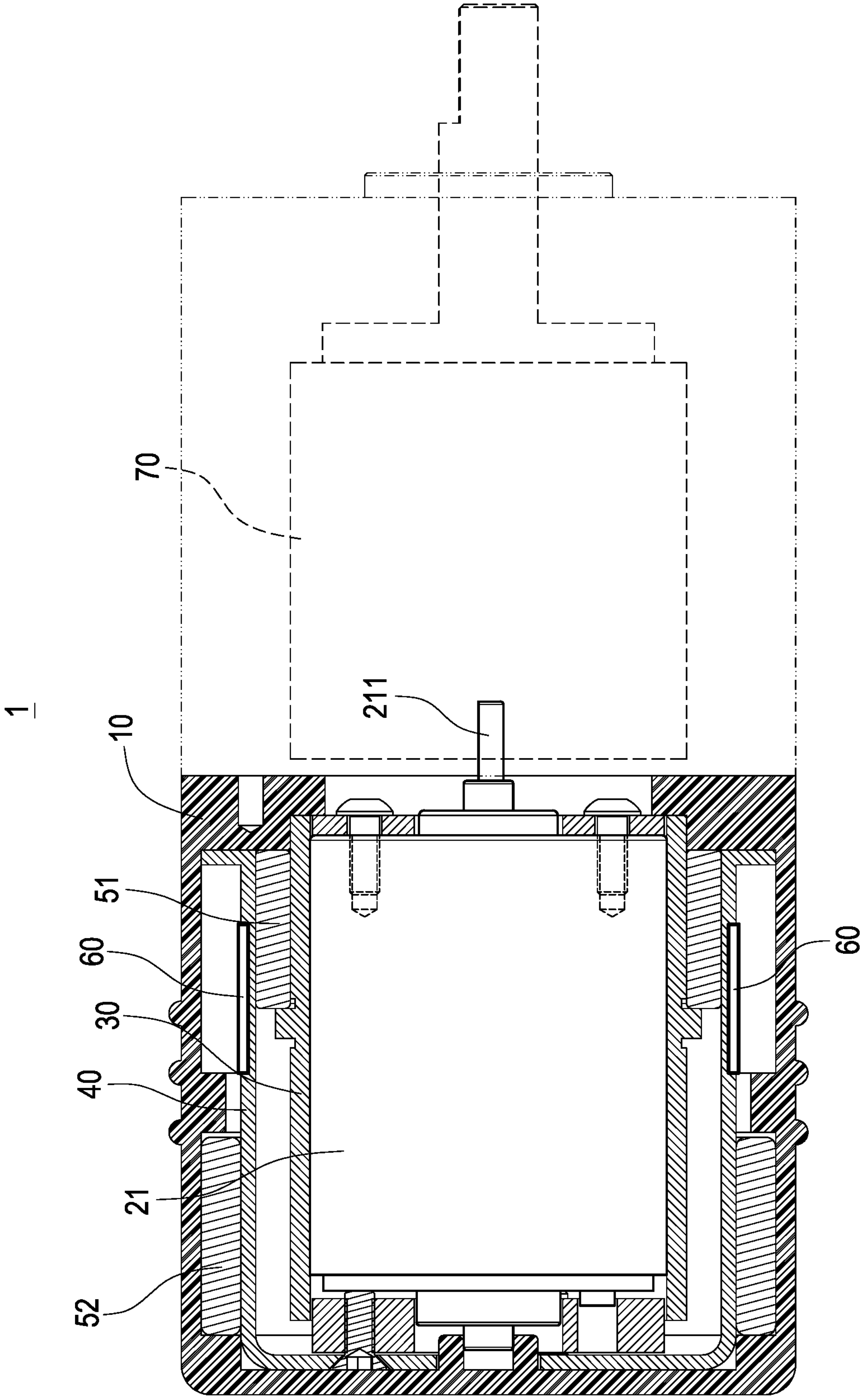
FIG. 6 is a schematic view showing an application of a torque sensing device of this disclosure.

With reference to FIG. 6 for the schematic view showing an application of the torque sensing device of his disclosure, the torque sensing device 1 of this disclosure further includes a gearbox 70. The gearbox 70 is connected to a drive shaft 211 of the power body 21 to supply the required rotational output. In addition, the power tool further includes a battery and a control board (not shown in the figures). The battery and the control board are installed in the outer casing 10, and the control board is electrically connected to the power body 21 and the torque sensor 60.

After the operation of the power body 21 has exceeded a predetermined torque, the control board receives a signal transmitted from the torque sensor 60 and immediately stop the operation of the power body 21.

It is noteworthy that the torque sensor 60 of this disclosure is not directly fixed to a component that transmits power, so that the torque sensor 60 may not be affected by the vibration of the power body 21. As a result, the torque sensor 60 may detect the torque of the power body 21 to provide an accurate torque value.

While this disclosure has been described by means of specific embodiments, numerous modifications and variations could be made thereto by those skilled in the art without departing from the scope and spirit of this disclosure set forth in the claims.

What is claimed is:

1. A torque sensing device of a power tool (1), the torque sensing device comprising:

an outer casing (10);

a power structure (20), installed in the outer casing (10), and comprising a power body (21) with a drive shaft (211);

a jacket (30), adapted to directly sheathe the power body (21);

an inner casing socket (40), adapted to sheathe the jacket (30);

a bearing set (50), comprising a front bearing (51) and a rear bearing (52), and the front bearing (51) adapted to directly sheathe the jacket and installed between the jacket (30) and the inner casing socket (40), and the rear bearing (52) adapted to directly sheathe the inner casing socket (40) and installed between the inner casing socket (40) and the outer casing (10); and at least one torque sensor (60), installed on the inner casing socket (40).

2. The torque sensing device according to claim 1, wherein the jacket (30) comprises a jacket front side (31) proximate to the drive shaft (211), and the front bearing (51) is disposed on the jacket front side (31).

3. The torque sensing device according to claim 2, wherein the inner casing socket (40) comprises an inner casing rear side (42) disposed away from the drive shaft (211), and the rear bearing (52) is disposed on the inner casing rear side (42).

4. The torque sensing device according to claim 3, wherein the jacket front side (31) comprises a plurality of front pawls (311) disposed on an edge thereof, and a jacket rear side (32) comprises a plurality of rear pawls (321) disposed on an edge thereof.

5. The torque sensing device according to claim 4, wherein the power structure (20) further comprises a pair of motor fixing plates (22), the pair of motor fixing plates (22) comprise a front fixing plate (221) and a rear fixing plate (222) installed on two sides of the jacket (30) respectively, the front fixing plate (221) comprises a plurality of front lugs (2211) disposed spacedly on a periphery thereof, the rear fixing plate (222) comprises a plurality of rear lugs (2221)) disposed spacedly on a periphery thereof, the front fixing plate (221) is positioned on an end of the jacket front side (31) through the front lugs (2211) and the front pawls (311) being engaged with each other, and the rear fixing plate (222) is positioned on an end of the jacket rear side (32) through the rear lugs (2221) and the rear pawls (321) being engaged with each other.

6. The torque sensing device according to claim 5, wherein the power structure (20) further comprises a plurality of front locking members (23), and the front fixing plate (221) comprises a plurality of first locking holes (2210), and the power body (21) comprises a plurality of second locking holes (210) correspondingly, and the front fixing plate (221) is fixed to the power body (21) through the front locking members (23) passing through the first locking holes (2210) and the second locking holes (2210).

7. The torque sensing device according to claim 3, wherein the inner casing socket (40) comprises an inner casing front side (41) near the drive shaft (211), and the inner casing socket (40) is fixed to an inner wall of the outer casing (10) at an end of the inner casing front side (41).

8. The torque sensing device according to claim 5, wherein the inner casing socket (40) comprises a rear baffle (421) disposed on the inner casing rear side (42), and the jacket (30) is fixed to the rear baffle (421) through the rear fixing plate (222) to link and rotate the inner casing socket (40).

9. The torque sensing device according to claim 8, wherein the power structure (20) further comprises a plurality of rear locking members (24), and the rear fixing plate (222) comprises a plurality of third locking holes (2220), and the rear baffle (421) comprises a plurality of fourth locking holes (4210) correspondingly, and the rear fixing plate (222) is fixed to the inner casing socket (40) the rear locking members (24) passing through the fourth locking holes (4210) and the third locking holes (2220).

10. The torque sensing device according to claim 1, wherein the torque sensor (60) is a pair in number, and the pair of the torque sensors (60) are installed on two sides of the inner casing socket (40) opposite to each other.

* * * * *